United States Patent
Vale et al.

(10) Patent No.: US 7,365,758 B2
(45) Date of Patent: Apr. 29, 2008

(54) SYSTEM AND METHOD FOR SCALING DATA ACCORDING TO AN OPTIMAL WIDTH FOR DISPLAY ON A MOBILE DEVICE

(75) Inventors: Peter Ormand Vale, Seattle, WA (US); Zeke Koch, Seattle, WA (US); Jay Franklin McLain, Woodinville, WA (US); Andrew Dadi, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 58 days.

(21) Appl. No.: 10/413,946

(22) Filed: Apr. 14, 2003

(65) Prior Publication Data

US 2004/0075673 A1     Apr. 22, 2004

Related U.S. Application Data

(60) Provisional application No. 60/420,428, filed on Oct. 21, 2002.

(51) Int. Cl.
*G09G 5/22* (2006.01)

(52) U.S. Cl. ............... 345/660; 345/698; 345/581; 345/3.1

(58) Field of Classification Search ........ 345/660, 345/678, 684, 688, 689, 798, 800, 698, 3.1, 345/581
See application file for complete search history.

(56) References Cited

U.S. PATENT DOCUMENTS

| | | | | |
|---|---|---|---|---|
| 417,239 | A * | 12/1889 | Demke et al. | 105/257 |
| 5,812,131 | A * | 9/1998 | Bertram | 715/798 |
| 5,897,644 | A * | 4/1999 | Nielsen | 715/513 |
| 5,910,805 | A * | 6/1999 | Hickey et al. | 345/467 |
| 5,933,830 | A * | 8/1999 | Williams | 707/100 |
| 5,937,041 | A * | 8/1999 | Cardillo et al. | 379/93.25 |
| 5,952,994 | A * | 9/1999 | Ong et al. | 345/668 |
| 5,986,654 | A * | 11/1999 | Alexander et al. | 715/744 |
| 6,011,537 | A * | 1/2000 | Slotznick | 715/733 |
| 6,023,714 | A * | 2/2000 | Hill et al. | 715/513 |
| 6,029,182 | A * | 2/2000 | Nehab et al. | 715/523 |
| 6,091,387 | A * | 7/2000 | Ueno et al. | 345/89 |
| 6,161,140 | A * | 12/2000 | Moriya | 709/228 |
| 6,178,272 | B1 * | 1/2001 | Segman | 382/298 |
| 6,199,082 | B1 * | 3/2001 | Ferrel et al. | 715/522 |
| 6,414,698 | B1 * | 7/2002 | Lovell et al. | 715/800 |
| 6,473,609 | B1 * | 10/2002 | Schwartz et al. | 455/406 |

(Continued)

OTHER PUBLICATIONS

Efficient web browsing on handheld devices using page and form summarization, Jan. 2002, ACM Transactions on Information Systems (TOIS), vol. 20 Issue 1, Publisher: ACM Press.*

*Primary Examiner*—Kee M. Tung
*Assistant Examiner*—Javid A Amini
(74) *Attorney, Agent, or Firm*—Merchant & Gould P.C.; Ryan T. Grace

(57) ABSTRACT

A system and method is included for scaling blocks of data according to an optimal width to increase usability of the data when scaling the blocks of data to fit a screen on a mobile device. The optimal width provides a minimum width to which the block of data may be scaled, such that scaling the block of data to a level where usability of the data is compromised is avoided.

16 Claims, 5 Drawing Sheets

U.S. PATENT DOCUMENTS

| | | | |
|---|---|---|---|
| 6,684,087 B1 * | 1/2004 | Yu et al. | 455/566 |
| 6,697,734 B1 * | 2/2004 | Suomela | 701/212 |
| 6,721,747 B2 * | 4/2004 | Lipkin | 707/10 |
| 2002/0024506 A1 * | 2/2002 | Flack et al. | 345/169 |
| 2002/0049788 A1 * | 4/2002 | Lipkin et al. | 707/513 |
| 2002/0113784 A1 * | 8/2002 | Feilmeier et al. | 345/419 |
| 2002/0149609 A1 * | 10/2002 | Suzuki et al. | 345/698 |
| 2003/0071832 A1 * | 4/2003 | Branson | 345/698 |
| 2003/0214506 A1 * | 11/2003 | Koselj et al. | 345/519 |
| 2004/0075673 A1 * | 4/2004 | Vale et al. | 345/660 |
| 2004/0117735 A1 * | 6/2004 | Breen | 715/517 |

* cited by examiner

SYSTEM AND METHOD FOR SCALING DATA ACCORDING TO AN OPTIMAL WIDTH FOR DISPLAY ON A MOBILE DEVICE

RELATED APPLICATIONS

This application claims the benefit of U.S. Provisional Application No. 60/420,428 filed on Oct. 21, 2002, which is hereby claimed under 35 U.S.C. §119(e).

FIELD OF THE INVENTION

The present invention relates generally to mobile computing, and more particularly to scaling data according to an optimal width for display on a mobile device.

BACKGROUND OF THE INVENTION

Small, mobile computing devices such as personal desktop assistants, including hand-held and pocket-sized computers, tablet personal computers and the like, are becoming important and popular user tools. In general, they have become small enough to be extremely convenient, while consuming less battery power, and at the same time have become capable of running more powerful applications. Although the computing circuitry of such devices continues to shrink in size, the area available for displaying data to a user shrinks as well. The usability of such data may be problematic due to the relatively small size of the display.

For example, data is often displayed in the form of a "web page" that includes text, tables, images, blocks of text, and other varieties of display information. The display information included on a web page is optimized to be displayed on a screen having a specified minimum size. When the size of the screen available is smaller than the specified minimum size, such as on a mobile device, the mobile device may be unable to show the display information in a usable format.

SUMMARY OF THE INVENTION

The present invention is directed to a system and method for scaling blocks of data to an optimal width when scaling the blocks to fit a screen on a mobile device.

When adapting content designed for larger (desktop PC-sized) screen resolutions to mobile devices with small screens, an objective of the scaling may be to minimize horizontal scrolling. Horizontal scrolling refers to a requirement on a user to "scroll" the viewing window of the data in a horizontal direction in order to completely view the data provided. Horizontal scrolling is contrasted with "vertical scrolling." Vertical scrolling refers to a requirement on a user to "scroll" the viewing window of the data in a vertical direction. Vertical scrolling is generally accepted as a preferred method of scrolling over horizontal scrolling.

When horizontal scrolling is minimized, the data is scaled to fit the width of a screen for a mobile device. However, the height associated with the data that results in vertical scrolling may reach a level where usability of the data is compromised. For example, a block of content in a tabular form (or similar) may result in very thin and long columns in order to ensure that the table fits to the width of the screen. The thin, long columns may result in a page layout that is unusable and often less preferred to not scaling the data at all. The present invention limits the amount of scaling that is applied to a column in a table, large "chunks" of text such that usability and readability are enhanced or maintained rather than reduced.

According to one aspect of the present invention, the optimal width provides a minimum width to which the blocks of data may be scaled. Particular types of blocks, depending on the data they contain, may result in a reduction of the usability of the data when the blocks are fully scaled to fit the screen on the mobile device. In contrast, scaling the blocks to an optimal width preserves the integrity of the data by scaling to a block width that maintains the usability of the data when the data is displayed on the mobile device. Horizontal scrolling may be required to view the entire block of data since it may be wider than the screen on the mobile device. Usability of the data is increased however, since the block of data is scaled to a width that is more readily viewable by a user.

DESCRIPTION OF THE PREFERRED EMBODIMENT

Briefly stated, the present invention is directed at scaling data provided to a mobile device to fit a screen associated with the mobile device according to an optimal width for the data. These and other aspects of the invention will become apparent to those skilled in the art after reading the following detailed description.

Illustrative Operating Environment

Figure 1:
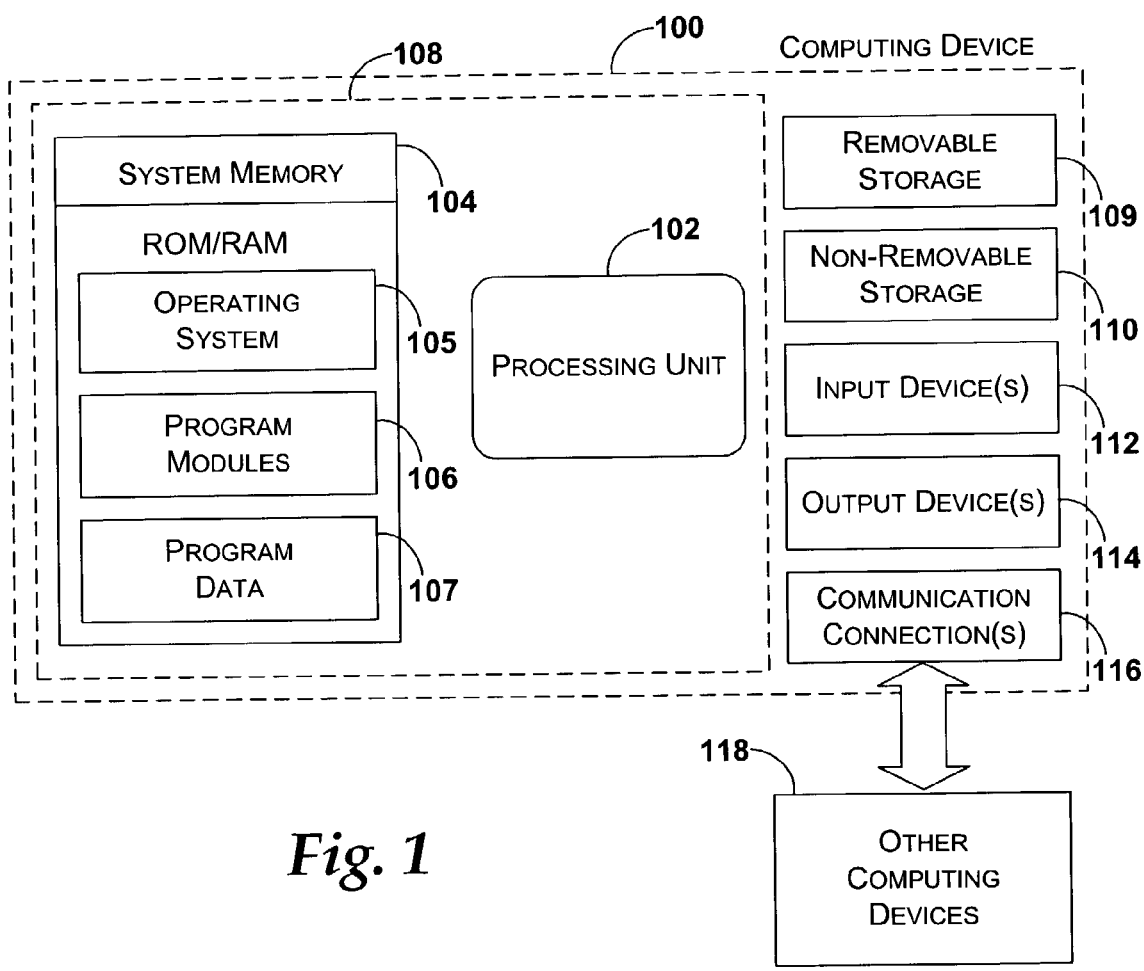
FIG. 1 illustrates an exemplary computing device that may be used in one exemplary embodiment of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
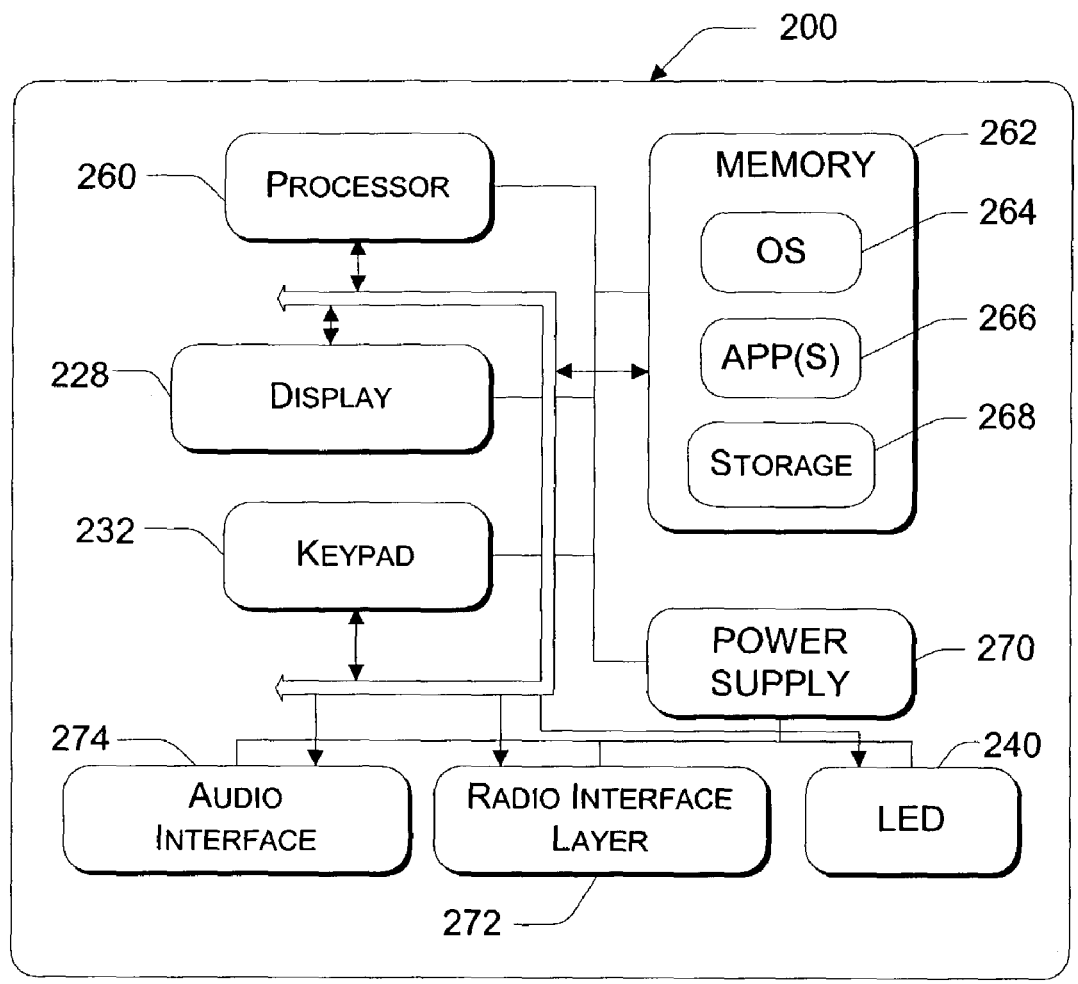
FIG. 2 illustrates an exemplary mobile device that may be used in one exemplary embodiment of the present invention.

With reference to FIG. 2, one exemplary system for implementing the invention includes a computing device configured as a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include phone dialer programs, installation wizard programs, email programs, scheduling programs, PIM (personal information management) programs, word processing programs, spreadsheet programs, Internet browser programs, data scaling programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Process for Scaling According to an Optimal Width

Figure 3:
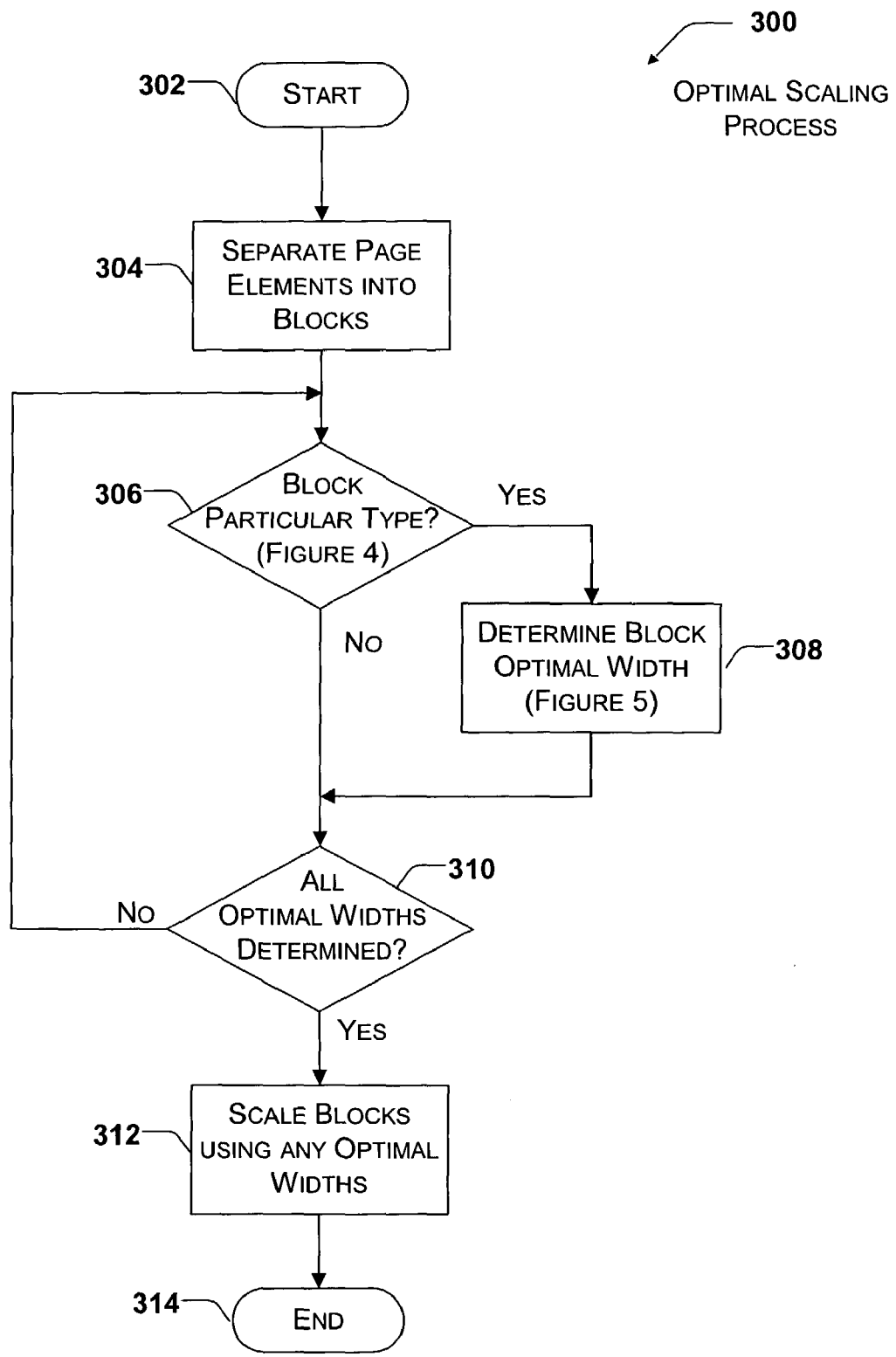
FIG. 3 is a logical flow diagram of an exemplary optimal scaling process according to the present invention.

FIG. 3 is a logical flow diagram of an exemplary optimal scaling process according to the present invention. The process 300 begins at start block 302 where the mobile device is powered on and has received a page or other data to display on the mobile device. In one embodiment, the page is a web page that is includes elements such as tables, text, images, and the like. The process 300 continues at block 304.

At block 304, the elements of the page are grouped in blocks. For example, a paragraph may be considered a block of text elements. A table on a page may be considered another block. Since pages often have elements within other elements, it is also possible to have sub-blocks within larger parent blocks (e.g., a column within a table). In one embodiment, text is not a block. Accordingly, the words within the paragraph flow such that the text fits within the paragraph block when the paragraph block is scaled. To reduce horizontal scrolling rather than vertical scrolling, the height of a block is allowed to grow if necessary to make the width of the block fit within its parent. In one embodiment, top-level parent block uses the screen width for its limit. This way, if sub-blocks can be scaled appropriately, horizontal scrolling is avoided. Those elements not considered blocks (e.g, text) flow and move around within a block when scaling to fit within the block's width. Once the page of data is grouped into blocks, processing proceeds to decision block 306.

At decision block 306, a decision is made whether a block is of a particular type that may have an associated optimal width. In one embodiment, a table is one of the selected types of blocks that may have an associated optimal width. In another embodiment, the column of a table is one of the selected types of blocks that may have an associated optimal width, rather than the table itself. A block may be scaled too much in order to fit the screen, such that the usability of the data within the block is reduced. For example, the columns of a table may be too thin to allow a user to easily read the data the columns contain. Scaling the table to an optimal width rather than to fit the screen maintains the usability of the data by allowing a user to more readily ascertain the data when displayed. Another illustrative process for determining whether a block is a particular type that may have an associated optimal width is described in more detail in the discussion of FIG. 4 below. If the block is not a particular type that may have an associated optimal width, processing advances to decision block 310. However, if the block is a particular type that may have an associated optimal width, processing moves to block 308.

At block 308, the optimal width is determined for the block. The optimal width of a block may be wider than the width of the screen on the mobile device to maintain or increase usability of the data. An illustrative process for determining the optimal width of a block of data is described in more detail in the discussion of FIG. 5 below. Processing proceeds to block decision block 310.

At decision block 310, a determination is made whether all the optimal widths for each particular type of block have been determined. If all optimal widths have not been determined, then processing returns to block 306 where process 300 continues. Alternatively, if all optimal widths have been determined, then processing moves to block 312.

At block 312, the blocks are scaled to their determined scaled width. Any optimal widths associated with any of the blocks are used in scaling the blocks of the page of data. In one embodiment, a block may not be required to be scaled to the optimal width. For example, the width of a screen on a mobile device may be 200 pixels. The optimal width of table is 150 pixels. The table need only be scaled to 200 pixels to accommodate the width of the screen. However, if the optimal width is 250 pixels, the scaling of the table is limited to a width of 250 pixels despite the width of the screen. In another embodiment, a block is scaled to minimize horizontal scrolling when an optimal width is not utilized. Accordingly, usability of the mobile device for viewing the page of data is increased while minimizing horizontal scrolling. Processing then proceeds to block 314, where the process ends.

In an alternative embodiment, each block may be scaled when the optimal width for the block is determined. Scaling the blocks after all optimal widths are determined is merely exemplary of one process for scaling the blocks according to any optimal widths. The processes of determining the optimal width for the particular blocks and scaling the blocks of data may occur concurrently.

Figure 4:
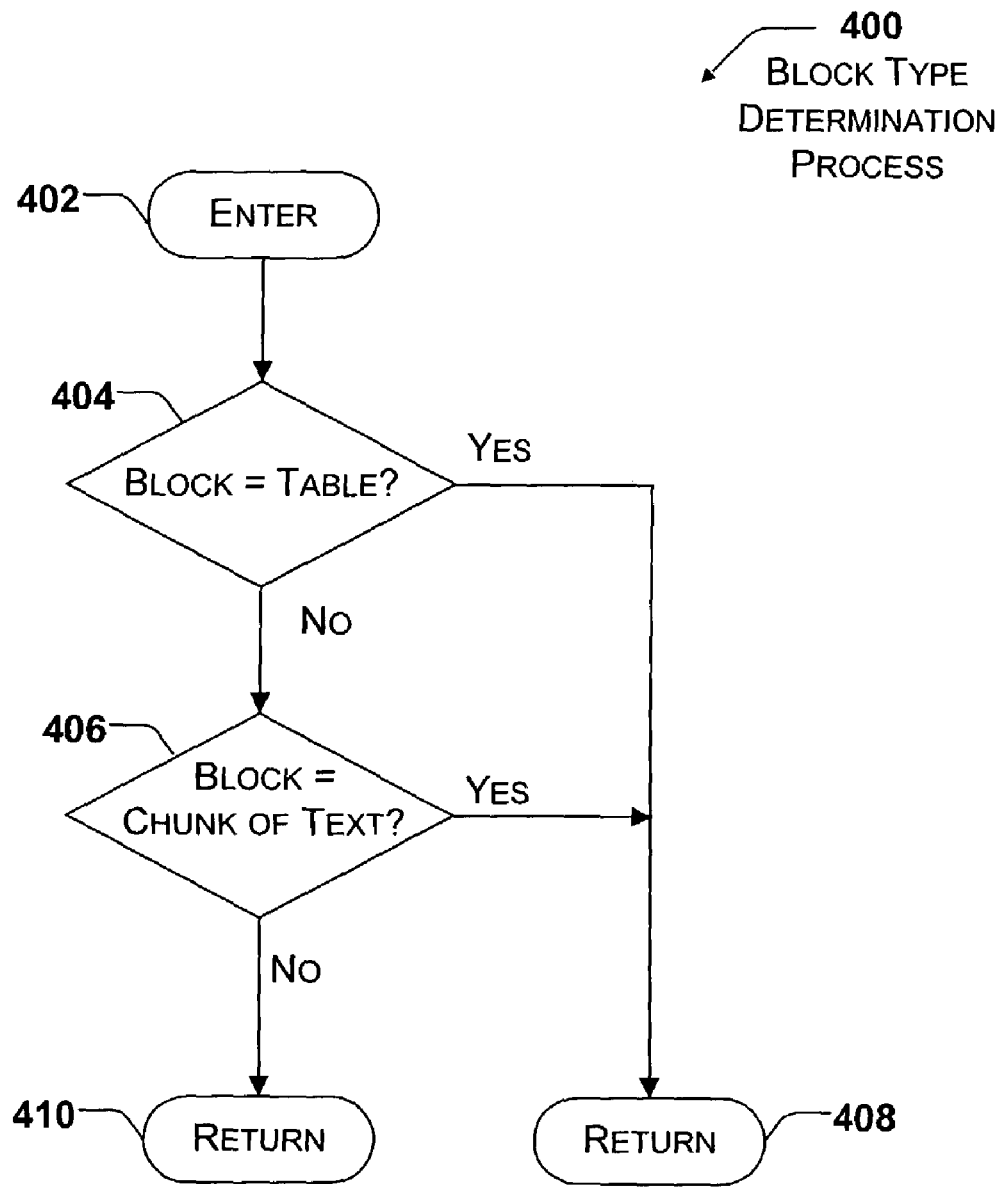
FIG. 4 is a logical flow diagram of an exemplary block type determination process according to the present invention.

FIG. 4 is a logical flow diagram of an exemplary block type determination process according to the present invention. The process 400 enters at block 402 when process 300 shown in FIG. 3 enters block 306. The process 400 may be used in place of or in compliment to decision block 306. The process 400 continues at block 404.

At decision block 404, a determination is made whether the block being examined corresponds to a table. In the embodiment shown, a table is one of the types of blocks that may have an associated optimal width. The presence of a table indicates that an optimal width may need to be applied for this block during the scaling process. If a determination is made that the block corresponds to a table, processing advances to block 408, where processing returns to block 308 of process 300 shown in FIG. 3. However, if a determination is made that the block of data does not correspond to a table, processing proceeds to decision block 406.

At decision block 406, a determination is made whether the block being examined corresponds to a relatively large "chunk" of text. The chunk of text may be in the form of a number of characters unbroken by non-text elements. Alternatively, the chunk of text may be a number of words that are arranged consecutively. Further, the chunk of text may be some number of paragraphs that are consecutively arranged. The presence of a chunk of text indicates that an optimal width may need to be applied during the scaling process. If a determination is made that the block corresponds to a chunk of text, processing advances to block 408, where the process returns to block 308 of process 300 shown in FIG. 3. However, if a determination is made that the block of data does not correspond to a chunk of text, then the block being examined is not a block that may have an associated optimal width. Accordingly, processing proceeds to block 410, where the process returns to decision block 310 of process 300 shown in FIG. 3.

In other embodiments, a variety of types of blocks may be added or removed from process 400 so that an optimal width may be associated with other block types. In one example, a decision block (e.g., 407) is included after decision block 406. This additional decision block determines whether the block of data is associated with an additional block type (e.g., an image). Accordingly, if the block of data corresponds to the additional block type, then an optimal width is determined for the block of data. Otherwise, if a block of data does not correspond to a table, chunk of text, or the additional block type (e.g., an image), then an optimal width is not associated with the block. By adding or removing block types from process 400, other blocks of data may be associated with an optimal width, other than tables or chunks of text as shown in FIG. 4.

Figure 5:
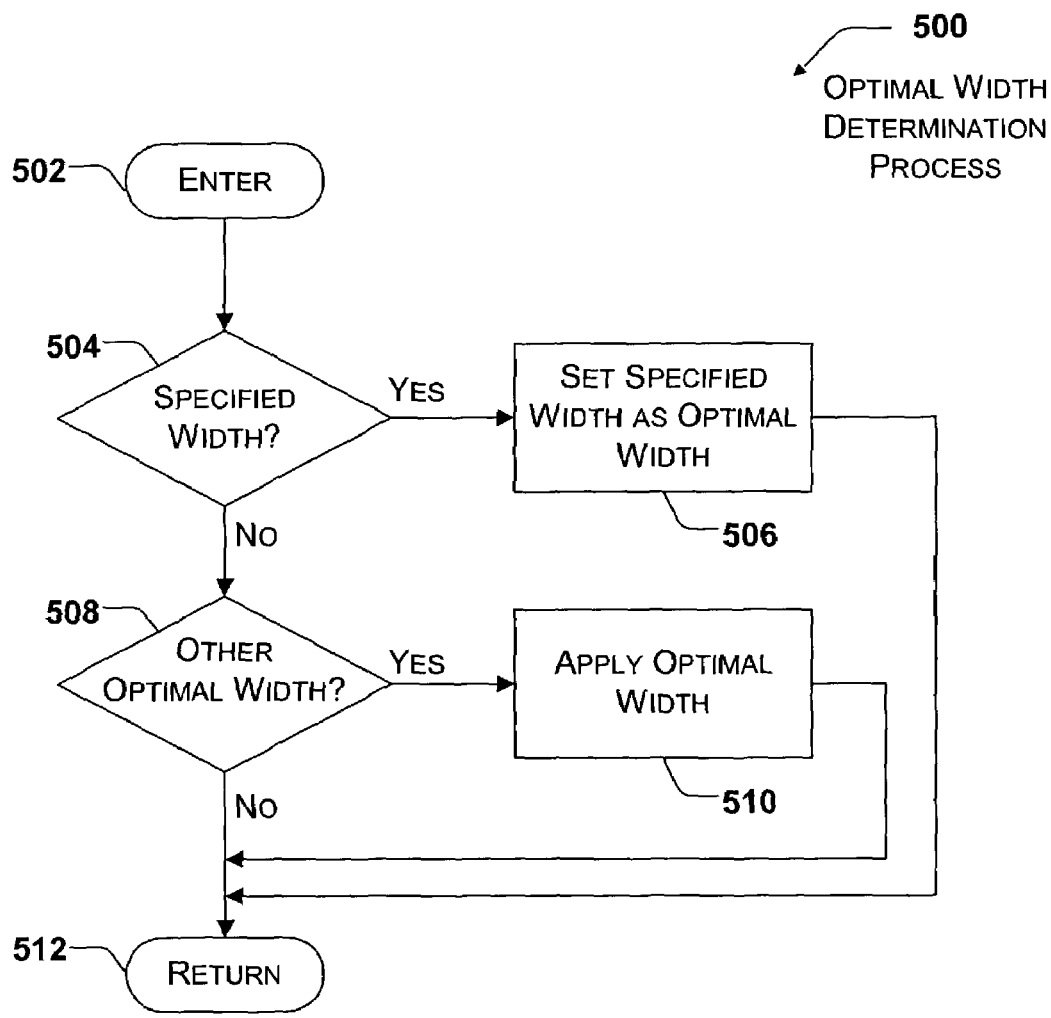
FIG. 5 is a logical flow diagram of an exemplary optimal width determination process according to the present invention.

FIG. 5 is a logical flow diagram of an exemplary optimal width determination process according to the present invention. The process 500 enters at block 502 when process 300 shown in FIG. 3 enters block 308. The process 500 continues at decision block 504.

At decision block 504, a determination is made whether a specified width exists for a block. The width of the block may have been previously set to display the block of data in a specified format or for another requirement. For example, a table may include a column that is set to a selected width. Accordingly, the block has a specified width corresponding to the selected width of the column. If there is a specified width, processing moves to block 310.

At block 310, the specified width is set as the optimal width for the block of data. The optimal width corresponds to the minimum width to which a block may be scaled. As described in the discussion of FIG. 3, a block may be scaled to a width wider than its optimal width, but not to a width narrower than its optimal width. Setting the optimal width of the block according to its specified width ensures that the data within the block is displayed as originally intended. In one embodiment, the specified width is set as the optimal width under the assumption that when a selected width exists for a block, deviation from that selected width should be avoided. In another embodiment, a separate scaling factor may also be applied to a block with a specified width to substantially maintain the format of the data while scaling the data for display on the mobile device. Displaying the data as originally intended, or substantially as originally intended, reduces scaling of the block and maintains the integrity of the data when the data is displayed on the mobile device. Once the specified width is set as the optimal width, processing proceeds to block 512.

Alternatively, if a determination is made that a specified width is not associated with the block at decision block 504, processing moves to decision block 508. At decision block 508, a determination is made whether another basis for the optimal width is present. For example, a default optimal width may be present for a chunk of text or table of a predetermined size. The default optimal width is used to prevent the readability and usability of the data from being compromised by the scaling. If another basis for an optimal width is present, processing moves to block 510.

At block 510, the optimal width is applied to or associated with the block of data. If a default width is present, the default width is set as the optimal width. Accordingly, when the table or the chunk of text is scaled, the block is not scaled to a width less than the optimal width. Once the optimal width is applied to the block of data, processing proceeds to block 512.

Alternatively, if a decision is made at decision block 508 that no other basis for an optimal width is present, processing moves to block 512. At block 512, processing returns to decision block 310 of process 300 shown in FIG. 3.

The above specification, examples and data provide a complete description of the method and use of the invention. Since many embodiments of the invention can be made without departing from the spirit and scope of the invention, the invention resides in the claims hereinafter appended.

We claim:

1. A computer-implemented method for scaling a page of data according to an optimal width for a single segment display on a mobile device, the method comprising:

receiving a page of data on the mobile device that requires scaling for usability, wherein the page of data includes a webpage;

separating the page of data into blocks of data after receiving the page of data on the mobile device, such that each block of data corresponds to a display data element of the page of data, wherein the display data element includes at least one member of a group comprising: a display text block and a display table block;

determining whether the display data element is associated with an optimal width, wherein the optimal width is a width, below which, the display data element is not usable on the single segment display, wherein the optimal width is a preset optimal width that is associated with the display data element, wherein optimal widths are determined for each of the blocks of data prior to scaling according to its optimal width;

scaling the display data element to minimize horizontal scrolling when the display data element is not associated with an optimal width;

when the display data element is associated with an optimal width:

determining whether the optimal width is greater than the width of the single segment display;

scaling the display data element to the optimal width when the optimal width is greater than the width of the single segment display; and scaling the display data element to at least the width of the single segment display when the optimal width is not greater than the width of the single segment display.

2. The computer-implemented method of claim 1, wherein the optimal width of the block of data corresponds to a specified width of the block of data, wherein the specified width is set for the block of data prior to determining the optimal width.

3. The computer-implemented method of claim 1, wherein the optimal width corresponds to a default width of the block of data, wherein the default width represents a minimal width for the block of data that corresponds to the display data element of the block of data.

4. The computer-implemented method of claim 1, wherein the block of data is scaled according to a width associated with a single segment screen of the mobile device when the width associated with the single segment screen is wider than the optimal width.

5. The computer-implemented method of claim 1, wherein the optimal width for the block of data is determined according to a width associated with another block of data contained within the block of data.

6. The computer-implemented method of claim 1, wherein a separate scaling factor is applied to a display data element that is not associated with an optimal width and a display element that is associated with an optimal width.

7. A mobile device, comprising:

a processor;

a single segment display;

a memory into which a plurality of computer-executable instructions are loaded, the computer-executable instructions performing a method comprising:

receiving a page of data on the mobile device that requires scaling on the single segment display of mobile device, wherein the page of data includes a webpage;

separating the page of data into blocks of data for scaling the blocks of data to fit the display after receiving the page of data on the mobile device, wherein each block of data corresponds to a display data element, wherein the display data element includes at least one member of a group comprising: a display text block and a display table block;

determining whether the display data element is associated with an optimal width, wherein the optimal width is a width, below which, the display data element is not usable on the single segment display of the mobile device, wherein the optimal width is a preset optimal width that is associated with the display data element, wherein optimal widths are determined for each of the blocks of data prior to scaling according to its optimal width;

scaling the display data element to minimize horizontal scrolling when the display data element is not associated with an optimal width;

when the display data element is associated with an optimal width:

determining whether the optimal width is greater than the width of the single segment display;

scaling the display data element to the optimal width when the optimal width is greater than the width of the single segment display; and scaling the display data element to at least the width of the single segment display when the optimal width is not greater than the width of the single segment display.

8. The mobile device of claim 7, the computer-executable instructions further comprising determining whether all optimal widths have been determined for the blocks of data prior to scaling a first block of data according to its optimal width.

9. The mobile device of claim 7, wherein the optimal width of a first block of data corresponds to a default width of the first block of data, wherein the default width represents a minimal width for the first block of data corresponding to the data of the first block of data.

10. The mobile device of claim 7, wherein the optimal width of a first block of data corresponds to a specified width of the first block of data, wherein the specified width is set for the first block of data prior to determining the optimal width.

11. A computer-readable storage medium encoded with computer-executable instructions for performing a method comprising:
   receiving a page of data on the mobile device that requires scaling, wherein the page of data includes a webpage;
   separating the page of data into blocks of data to scale the blocks of data for display on a single segment screen of a mobile device after receiving the page of data on the mobile device, wherein each block of data corresponds to a display data element, wherein the display data element includes at least one member of a group comprising: a display text block and a display table block;
   determining whether the display data element of a block of data requires scaling for usability on the mobile device;
   when the display data element requires scaling, determining whether the display data element is associated with an optimal width, wherein the optimal width is a width, below which, the display data element is not usable on the mobile device, wherein the optimal width is a preset optimal width that is associated with the display data element, wherein optimal widths are determined for each of the blocks of data prior to scaling according to its optimal width;
   scaling the block of data to minimize horizontal scrolling when the display data element is not associated with an optimal width;
   when the display data element is associated with an optimal width:
   determining whether the optimal width is greater than the width of the single segment display;
   scaling the block of data to at least the size of the screen when the optimal width is less than the width of the single segment display; and
   scaling the block of data to the optimal width when and the optimal width is greater than the width of the single segment display.

12. The computer-readable storage medium of claim 11, wherein the associated optimal width of the block of data corresponds to a specified width of the block of data, wherein the specified width is set for the block of data prior to determining its associated optimal width.

13. The computer-readable storage medium of claim 11, wherein the associated optimal width of the block of data corresponds to a default width of the block of data, wherein the default width represents a minimal width for the block of data that corresponds to the data within the block of data.

14. The computer-readable storage medium of claim 11, further comprising scaling the block of data according to a width associated with the single segment screen of the mobile device.

15. The computer-readable storage medium of claim 14, wherein a separate scaling factor is applied in scaling each block of data.

16. The computer-readable storage medium of claim 11, wherein scaling one of the blocks of data is avoided when the optimal width associated with the blocks of data corresponds to a specified width.

* * * * *